US012618979B1

(12) United States Patent
Manz et al.

(10) Patent No.: US 12,618,979 B1
(45) Date of Patent: May 5, 2026

(54) PRECISE WIDE AREA IONOSPHERE CORRECTION SOLUTION FOR MULTI-SPECTRUM ALTERNATIVE SOURCES OF SPACE BASED PNT SIGNALS

(71) Applicant: U.S. Government as Represented by the Secretary of the Army, Dover, NJ (US)

(72) Inventors: Paul Manz, Andover, NJ (US);
Thomas Blenk, Jr., Chatham, NJ (US);
Ekta Patel, Hillsborough, NJ (US);
Kevin Schaal, Lafayette, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 231 days.

(21) Appl. No.: 18/137,535

(22) Filed: Apr. 21, 2023

Related U.S. Application Data

(60) Provisional application No. 63/375,801, filed on Sep. 15, 2022.

(51) Int. Cl.
G01S 19/07 (2010.01)
G01C 21/00 (2006.01)

(52) U.S. Cl.
CPC .......... G01S 19/072 (2019.08); G01C 21/005 (2013.01); G01C 21/3841 (2020.08)

(58) Field of Classification Search
CPC .. G01S 19/072; G01C 21/3841; G01C 21/005
USPC .................................................... 342/357.44
See application file for complete search history.

(56) References Cited

U.S. PATENT DOCUMENTS

2020/0341154 A1* 10/2020 Takac ...................... G01S 19/43
2022/0011446 A1* 1/2022 Segal .................... G01S 19/073
2022/0128708 A1* 4/2022 Lee .................... H04B 7/18517

FOREIGN PATENT DOCUMENTS

AU        2014398394 A1 * 12/2016 ............. G01S 19/41
WO    WO-2016185500 A1 * 11/2016 ............. G01S 19/07

OTHER PUBLICATIONS

Garcia et al. "A Worldwide Ionospheric Model for Fast Precise Point Positioning," IEEE Transactions on Geoscience and Remote Sensing, vol. 53, No. 8, Aug. 2015, pp. 4596-4604 (Year: 2015).*

(Continued)

*Primary Examiner* — William Kelleher
*Assistant Examiner* — Samarina Makhdoom
(74) *Attorney, Agent, or Firm* — John P. DiScala

(57) ABSTRACT

An Ionosphere Correction Extrapolation (ICE) solution for correcting ionosphere-induced errors in a space-based positioning, navigation, and timing (PNT) signal uses a reference receiver to create a local ionosphere model. The ICE solution is able to accurately correct range measurements for single frequency or signals of opportunity user equipment (UE). The ICE solution produces a Vertical Total Electronic Content (VTEC) contour map that is centered with respect to a single dual-frequency reference receiver, such as a Global Positioning System (GPS) receiver and extending out to the visible horizon with respect to that reference receiver. The generated VTEC map enables the implementation of ionosphere correction without the need for a direct dual-frequency measurement.

19 Claims, 9 Drawing Sheets

(56) References Cited

OTHER PUBLICATIONS

Klobuchar. "A First-Order, Worldwide, Ionospheric, Time-Delay-Algorithm," AFCRL-TR-7 5-0502 Air Force Surveys in Geophysics, No. 324, Sep. 25, 1975, pp. 1-24 (Year: 1975).*

Bourke, Efficient Triangulation Algorithm Suitable for Terrain Modelling, Conference Presentation, Jan. 1989, Pan Pacific Computer Conference, Beijing, China.

Rowell et al., US-TEC Validation, http://www.swpc.noaa.gov/sites/default/files/images/u2/USTEC_ValidationDocument.pdf, Dec. 2006, National Oceanic and Atmospheric Administration, US.

Klobuchar, J. Ionospheric Time-Delay Algorithm for Single-Frequency GPS Users. IEEE Transactions on Aerospace and Electronic Systems, May 1987, vol. AES-23, No. 3, US.

Komjathy, A., Global Ionospheric Total Electron Content Mapping Using the Global Positioning System, Ph.D. dissertation, Department of Geodesy and Geomatics Engineering Technical Report No. 188, 1997 University of New Brunswick, Fredericton, New Brunswick, Canada.

Li et al., Digital Terrain Modeling Principles and Methodology, 2005, pp. 97-124, CRC Press, Boca Raton, Florida, US.

Misra, 5.3.2 Ionospheric Delay, Global Positioning System: Signals, Measurements, and Performance, Nov. 2011, pp. 162-169, Revised Second Edition, Ganga-Jamuna Press, Lincoln, MA, US.

* cited by examiner

PRECISE WIDE AREA IONOSPHERE CORRECTION SOLUTION FOR MULTI-SPECTRUM ALTERNATIVE SOURCES OF SPACE BASED PNT SIGNALS

CROSS-REFERENCE TO RELATED APPLICATIONS

This application claims the benefit under 35 USC § 119(e) of U.S. provisional patent application 63/375,801 filed on Sep. 15, 2022.

STATEMENT OF GOVERNMENT INTEREST

The inventions described herein may be manufactured, used and licensed by or for the United States Government.

FIELD OF THE INVENTION

The invention relates in general to positioning, navigation, and timing signals and in particular to error correction for positioning, navigation, and timing signals.

BACKGROUND OF THE INVENTION

The world is increasingly reliant on space-based systems for navigation and communication. Space-based systems, also known as Global Navigation Satellite Systems (GNSS), are an essential element of the global information infrastructure with impacts in numerous government and civilian applications. These include applications in the military, agriculture, aviation, disaster response, shipping and transportation sectors. In addition, major communications networks, banking systems, financial markets, and power grids depend heavily on space-based systems for precise time synchronization.

The Global Positioning System (GPS) system is the most well-known of these systems. GPS is a U.S.-owned utility that provides users with positioning, navigation, and timing (PNT) services. This system consists of a constellation of satellites, or space vehicles (SV), that transmit PNT signals to earth-based receivers. These receivers use the PNT signal to calculate the user's position and time.

The ionosphere is one of the single greatest error sources for space-based PNT signals. The ionosphere is part of Earth's upper atmosphere, and it reflects or modifies radio waves passing though it, such as PNT signals. For example, when left unaccounted for, the ionosphere can induce range errors of up to 100 meters at the Global Positioning Satellite (GPS) L1 frequency.

Thankfully, for many of today's GPS or other GNSS receivers, the ionosphere can be accounted for, to minimize overall PNT errors. Multiple methods exist to account for ionosphere effects including global models and direct measurement observations.

The most prevalent method employed in high precision applications is performing a dual-frequency measurement to make a direct ionosphere correction. GPS satellites broadcast PNT signals on two frequencies, the L1 and L2 frequencies. By observing the relative delay of signals broadcast from the same source but at different frequencies, user equipment (UE) can directly determine the range error induced by the ionosphere.

Unfortunately, many US Army and civilian applications are single-frequency solutions to limit size, power and cost. These single-frequency solutions are unable to make direct ionosphere observations using the dual-frequency method.

In addition, several other recently introduced factors and challenges have rendered current high precision ionosphere solutions inadequate. Often, high precision is required in Radio Frequency (RF) contested environments, or in dense urban terrain. In both conditions, it is low likelihood that dual-frequency measurements are achievable due to corruption or denial of one ore more signals originating from a single source. In addition, this problem space compounds with the proliferation of Low Earth Orbit satellites broadcasting PNT signals from space. Current and future LEO based PNT SVs transmit one frequency at a time to save on power consumption. A new solution is needed to provide accurate ionosphere corrections addressing these challenges that is frequency and SV agnostic.

A work-around method exists in which a dual-frequency U E can measure ionosphere effects for each space vehicle (SV) transmitting PNT signals and pass this information to single frequency UE. This approach works well when the UE has a clear view of all possible SVs. However, this "work around" does not work well when the UE view of SVs being skewed by terrain, obstacles or jamming. US Army precision weapons and munitions will likely operate from protective postures such as behind buildings, next to protective terrain, or under dense foliage, all while being exposed to adversary jamming attacks. Accordingly, precision guided munitions are forced to operate in sub-optimal conditions.

Another well-known approach to correcting ionosphere induced range errors is by applying the global Klobuchar model. The Klobuchar model, or global model, provides an estimate of the ionosphere delay as a function of local time at the Ionosphere Pierce Point (not the user's location). It is typically represented with up to eight adjustable parameters which are updated periodically depending on the season and solar activity.

While the global Klobuchar model is extremely beneficial, it is not suitable for high-precision applications. The Klobuchar model is estimated to reduce the root mean square (RMS) range measurement by approximately 50% with zenith delay errors up to 10 meters during the day. The is further exaggerated when the obliquity factor is accounted for. In addition, errors are anticipated to be larger during heightened solar activity.

Accordingly, there is a need for an ionosphere error correction solution which addresses several issues. First, the solution must not rely on a global model as this does not yield reliably accurate results. Second, the solution must be frequency and UE agnostic to extend to all GNSS, Signals of Opportunity (SoO) and UE variations. Lastly, the solution must provide accurate results comparable to the dual-frequency method to satisfy high precision applications.

SUMMARY OF INVENTION

One aspect of the invention is a method for correcting for ionosphere-induced errors in a single frequency positioning, navigation, and timing signal. The method comprises the step of producing a Vertical Total Electronic Content contour map centered with respect to a single dual-frequency Global Positioning System receiver and extending out to the visible horizon with respect to that Global Positioning System receiver.

Another aspect of the invention is a method for correcting for ionosphere-induced errors in a single frequency positioning, navigation, and timing signal. The method comprises the steps of: identifying a reference receiver; receiving inputs comprising a reference receiver location, an azimuth and an elevation for each space vehicle relative to the reference receiver and an ionosphere delay computed from a dual-frequency measurement for each space vehicle in view; determining the inter-frequency bias of the reference receiver; calculating a Vertical Total Electronic Content at an ionosphere Pierce Point of each space vehicle relative to the reference receiver; determining a thirteen point reference map using a three stage extrapolation process through the use of Delauney triangulation; receiving a positioning, navigation, and timing signal from a space vehicle at a single frequency; and employing the Vertical Total Electronic Content contour map by a user equipment to correct the positioning, navigation, and timing signal received at the single frequency.

The invention will be better understood, and further objects, features and advantages of the invention will become more apparent from the following description, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION

An Ionosphere Correction Extrapolation (ICE) solution for correcting ionosphere-induced errors in a space-based positioning, navigation, and timing (PNT) signal uses a reference receiver to create a local ionosphere model. The ICE solution is able to accurately correct range measurements for single frequency or signals of opportunity user equipment (UE), or when environmental factors limit UE multi-frequency signal access to a satellite. The ICE solution produces a Vertical Total Electronic Content (VTEC) contour map that is centered with respect to a single dual-frequency reference receiver, such as a Global Positioning System (GPS) receiver and extending out to the visible horizon with respect to that reference receiver. The generated VTEC map enables the implementation of ionosphere correction without the need for a direct dual-frequency measurement.

Advantageously, the ICE solution addresses several issues with existing approaches. The ICE solution yields reliably accurate results for single-frequency receivers that are comparable to the dual-frequency method. Second, the ICE solution is frequency, PNT source, and UE agnostic to extend to all GNSS, SoO and UE variations. In addition, the ICE solution allows for accurate precision when utilizing PNT sources other than GPS or when operating in a GPS contested environment.

Figure 1:
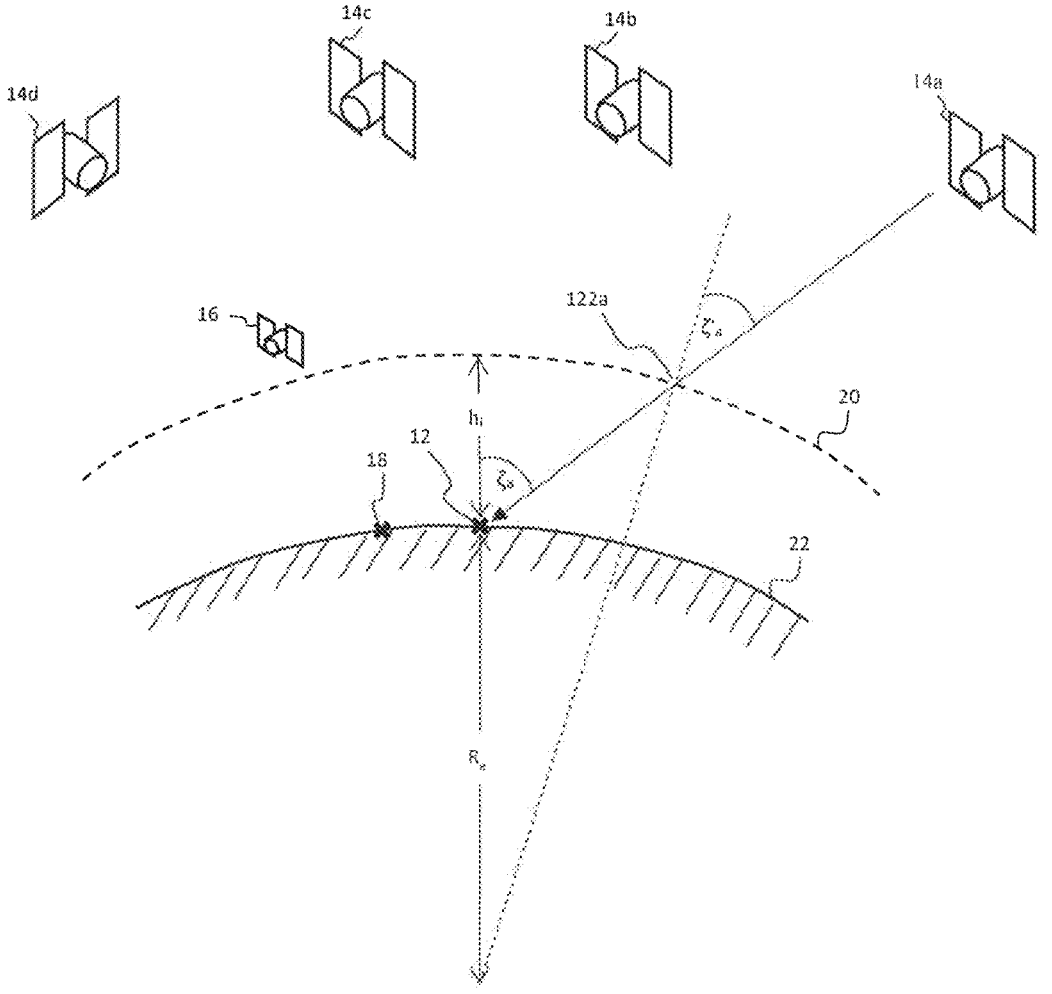
FIG. 1 is a diagram of a space-based positioning system, according to an illustrative embodiment.

FIG. 1 is a diagram of a space-based positioning system, according to an illustrative embodiment. The space-based positioning system comprises a reference receiver 12, one or more space-based PNT sources 14, 16 and a user receiver 18.

The reference receiver 12 is a receiver configured for receiving a PNT signal from at least four space-based PNT sources, also referred to as space vehicles, at dual frequencies. Throughout the Specification the reference receiver 12 will be described in the context of a GPS receiver receiving GPS signals from GPS satellites. However, the reference receiver 12 is not limited to a GPS receiver. The reference receiver 12 may be any receiver capable of receiving a PNT signal at two frequencies.

The space-based PNT sources 14, 16 comprise at least four sources 14a,d transmitting PNT signal at two frequencies. These four space-based PNT sources 14a,d are described throughout this specification as GPS satellites but they are not limited to GPS satellites. The space-based PNT sources 14a,d may be any sources that transmit a PNT signal at two frequencies. For example, the space-based PNT sources may be part of GLONASS or GALILEO or some other GNSS.

As will be described in further detail below, in addition to the four space-based PNT sources 14a,d transmitting on a dual frequency, the space-based PNT sources may also include other space-based PNT sources 16 including one or more low-earth orbit (LEO) satellites, medium-earth orbit (MEO) satellites or geostationary orbit (GEO) space-based sources. Further, these additional space-based sources are not limited to orbiting satellites and may be any source which is above the ionosphere, and which transmits at least 2 distinct signals in which relative delay between signals can be measured.

The reference receiver 12 and user receiver 18 are shown as being located at the surface of the Earth but may alternatively be located at an altitude above the Earth or submerged below the surface of the Earth. In the diagram, $R_e$ is the mean radius of the Earth, $h_I$ is the mean ionosphere height (~350 kilometers (km)), $\zeta$ is the angle relative to zenith of the satellite at the user position and $\zeta'$ is the angle relative to zenith of the satellite at the Ionosphere Pierce Point (IPP) 122.

Figure 2:
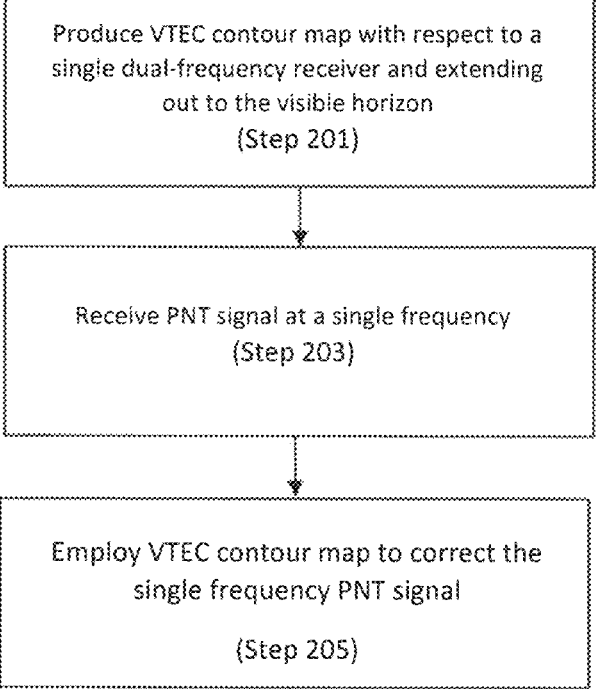
FIG. 2 is a flowchart illustrating a method for correcting ionosphere errors in a PNT signal at a single frequency user receiver, according to an illustrative embodiment.

FIG. 2 is a flowchart illustrating a method for correcting ionosphere errors in a PNT signal at a single frequency user receiver, according to an illustrative embodiment.

At any given time, the induced range error on any signal propagating through space is primarily determined by the following parameters: Vertical Total Electronic Content (VTEC), Ionosphere Pierce Point (IPP) 122, slant angle or obliquity factor (OF), and the frequency of the signal. Total Electronic Content (TEC) is defined as the number of electrons in a path defined by 1 meter squared (1 $m^2$) cross section along the path the signal transits from satellite to receiver and is defined below, where $n_e(l)$ is the variable electron density along the signal path, S is the space vehicle location, and R is the receiver location.

$$TEC = \int_S^R n_e(l)dl$$

Total Electronics Content Unit (TECU) is the standard unit used to describe TEC. 1 TECU is equivalent to a sixteen centimeter (16 cm) change in measured distance of a signal propagating at the GPS L1 frequency.

At step 201, a Vertical Total Electronic Content contour map is produced centered with respect to a single dual-frequency Global Positioning System receiver and extending out to the visible horizon with respect to that Global Positioning System receiver.

At step 203, a PNT signal at a single frequency from a space-based source is received at a user receiver 18.

At step 205, the Vertical Total Electronic Content contour map is employed by the user receiver 18 to correct the positioning, navigation, and timing signal received at the single frequency.

Figure 3:
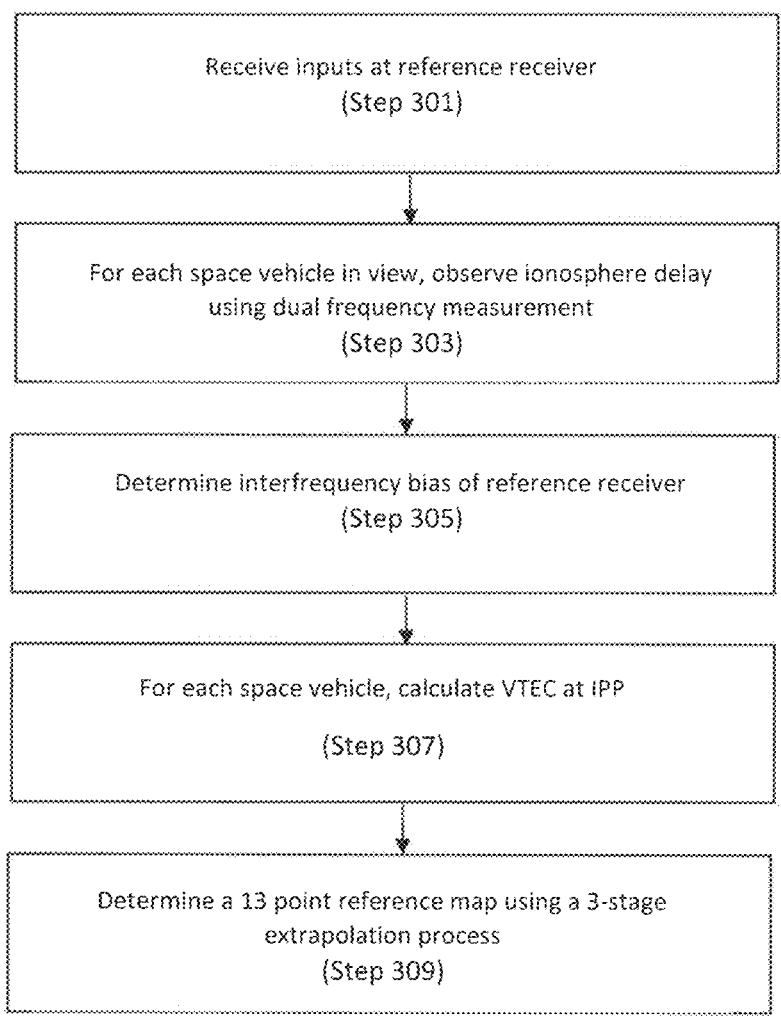
FIG. 3 is a flowchart illustrating a method for creating a Vertical Total Electronic Content contour map, according to an illustrative embodiment.

FIG. 3 is a flowchart illustrating a method for correcting ionosphere errors in a single frequency PNT signal, according to an illustrative embodiment.

At step 301, a reference receiver 12 is identified with a plurality of space vehicles 14 in view. For example, in the GPS system at least four space vehicles 14 are in view of a receiver. The reference receiver 12 retrieves the following inputs for each space vehicle 14: an azimuth and an elevation for each space vehicle 14 relative to the reference receiver 12. In an embodiment, the azimuth and elevation are determined based on the ephemeris of the satellite.

At step 303, an ionosphere delay is observed from a dual-frequency measurement for each space vehicle 14 in view. The reference receiver 12, capable of dual frequency measurements, observes the ionosphere delay effects directly. The reference receiver 12 achieves this by comparing the uncorrected pseudo-range measurements at a first frequency and a second frequency, the GPS L1 frequency and GPS L2 frequency in this embodiment. This calculation is shown in the equation below.

$$I_{L1} = \frac{f_{L2}^2}{\left(f_{L1}^2 - f_{L2}^2\right)}(\rho_{L2} - \rho_{L1})$$

At step 305, an inter-frequency bias of the reference receiver 12 is determined. The inter-frequency is used to adjust the VTEC values computed by the ICE algorithm, thereby allowing users of the method to mix their own measurements with the output of the model if desired.

To calculate the inter-frequency bias of the reference receiver 12, the ICE solution performs a first order linear fit of the L1 frequency ionosphere measurements where y represents the ionosphere delay, x represents the obliquity factor, m is the best first order fit, and b is the resulting y axis intercept (y=mx+b) representing the inter-frequency bias.

Obliquity factor is used as a multiplier to adjust the ionosphere delay that would have been experienced if the satellite were directly over ahead to expected delay as a function of the satellite's elevation in the sky. Obliquity factor is defined in the equation below where $R_e$ is the mean radius of the Earth, $h_I$ is the mean ionosphere height (~350 kilometers (km)), and $\zeta$ is the zenith angle of the satellite at the user position.

$$OF_i(\zeta) = \left[1 - \left(\frac{R_e \sin\zeta}{R_e + h_I}\right)\right]^{-1/2}$$

The zenith angle of the satellite at the user's position is related to the Ionosphere Pierce Point 122 as shown below where $\zeta$ and $\zeta'$ are the zenith angles of the satellite at the user position and Ionosphere Pierce Point 122 respectively.

$$\frac{\sin\zeta}{R_e + h_I} = \frac{\sin\zeta'}{R_e}$$

Alternatively, receivers may use a simplification of the previous two equations as a function of satellite elevation relative to the user as follows, where el is in units of semi-circles (1 semicircle=180° or π radians).

$$OF_i(el) = 1 + 16(0.53 - el)^3$$

With the above equation, the ionosphere delay can be defined for any obliquity factor as follows where $I_z$ is the ionosphere delay at zenith.

$$I(\zeta) = I_z OF_i(el)$$

At step 307, a Vertical Total Electronic Content is calculated at an Ionosphere Pierce Point 122 of each space vehicle 14 relative to the reference receiver 12. These inputs are used to calculate the VTEC at each space vehicle's IPP 122 relative to the reference receiver 12.

To calculate the VTEC at each space vehicle's IPP 122, the below equation is used.

$$Iono_{SV,i} = (VTEC * K * OF_i) + Bias_{LOCAL}$$

For each measured delay, the inter-frequency bias is first subtracted from the delay. This difference is then divided by the obliquity factor. The quotient is then multiplied by a conversion factor to convert from nanoseconds of delay at the applicable frequency to TEC units (TECU). The conversion factor, K, is frequency dependent and calculated according to the equation below. In an embodiment of the invention, the conversion factor is calculated at the L1 frequency and is approximately 0.5417.

$$K = \frac{40.308193 * 10^{16}}{(F)^2}$$

At step 309, a thirteen (13) point reference map is determined using a three-stage extrapolation process through the use of Delauney triangulation. The first stage of extrapolation focuses on the visible SV measurements, the second stage focuses on optimal extrapolation to the horizon, and the third stage focuses on a full map extrapolation and translation to the thirteen (13) point reference grid.

Figure 4:
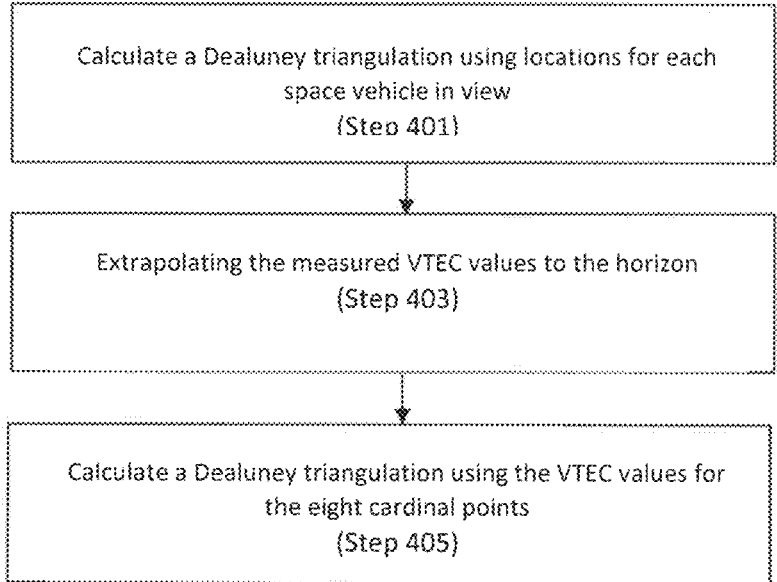
FIG. 4 is a flowchart illustrating a three-stage extrapolation process, according to an illustrative embodiment.

FIG. 4 is a flowchart illustrating a method for creating a Vertical Total Electronic Content contour map, according to an illustrative embodiment.

In the first stage of the three-stage extrapolation process, at step 401, a Delauney triangulation is calculated using locations for each space vehicle 14 in view.

In order to provide an appropriately weighted VTEC value between space vehicle 14 measurements, a Delaunay triangulation using the SV locations is calculated. A Delaunay triangulation for a given set of discrete points in a plane is a triangulation such that no point in the set is inside the circumcircle of any triangle. Delaunay triangulation produces triangles where the smallest interior angle is as large as possible At step 403, the second stage of the three-stage extrapolation process comprises the step of extrapolating the measured Vertical Total Electronic Content values to the horizon.

With the previous triangulation calculated, the measured VTEC values are extrapolated to the horizon. First, the positions of the four cardinal points (north, south, east and west) are calculated at the horizon and a direction is determined for each. Next, interpolate along each of the four cardinal directions until the last point that falls inside the triangulation is reached.

Figure 5:
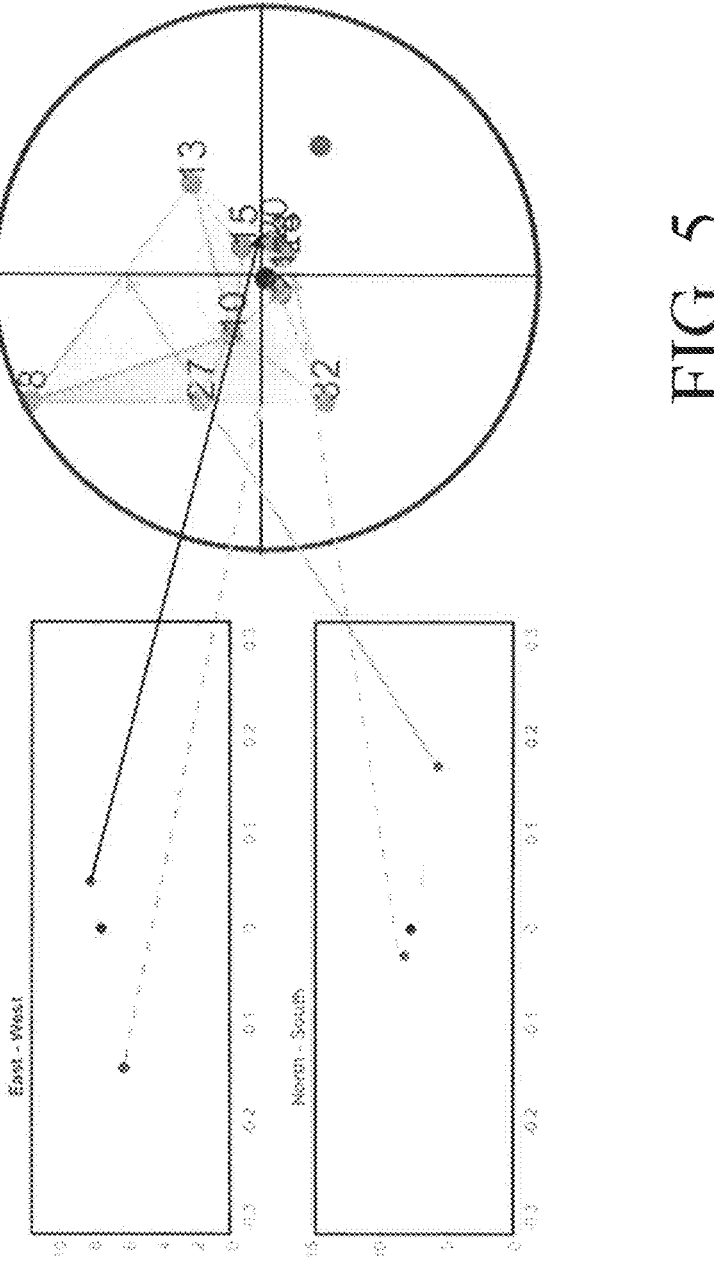
FIG. 5 shows a Delauney triangulation and linear fit for an example linear extrapolation, according to an illustrative embodiment.

FIG. 5 shows a Delauney triangulation and linear fit for an example linear extrapolation, according to an illustrative embodiment. The interpolated points are used to calculate the coefficients for four separate straight-line fits starting from the reference receiver 12 and extending along each cardinal direction.

Figure 6:
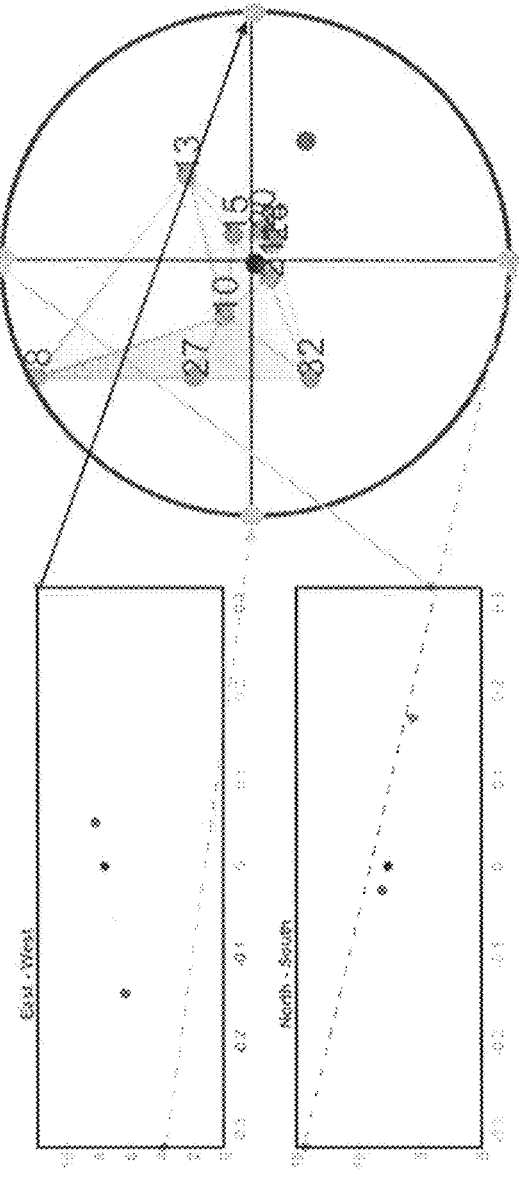
FIG. 6 illustrates an extrapolation of Vertical Total Electronic Content values to the horizon, according to an illustrative embodiment.

FIG. 6 illustrates an extrapolation of Vertical Total Electronic Content values to the horizon, according to an illustrative embodiment. Next, the Vertical Total Electronic Content values are calculated to the horizon. Four additional cardinal points are also added in the northeast, southeast, northwest and southwest directions. For these points, the VTEC value is calculated by averaging the VTEC values of the two neighboring horizon points.

Figure 7:
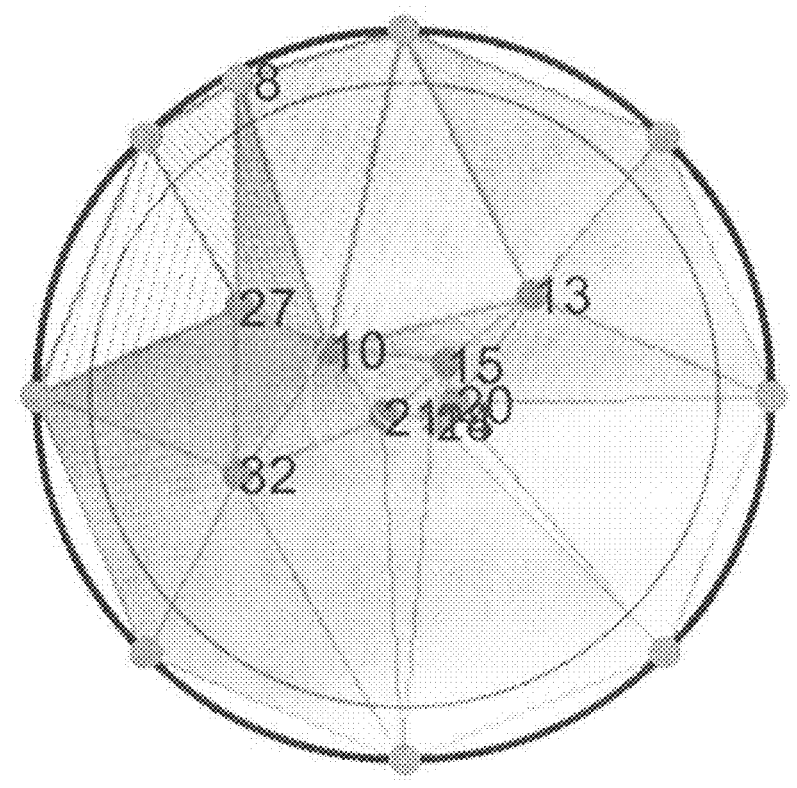
FIG. 7 illustrates a Delauney triangulation showing space vehicle nodes and horizon nodes.

At step 405, the third stage of the three-stage extrapolation process comprises calculating a new Delauney triangulation using the VTEC values for the eight cardinal points. FIG. 7 illustrates a Delauney triangulation showing space vehicle nodes and horizon nodes.

Figure 8:
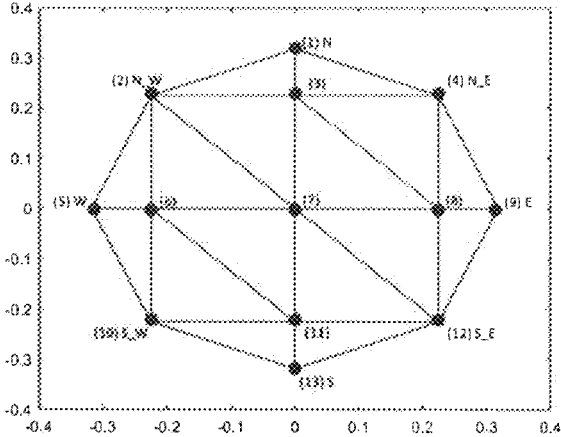
FIG. 8 illustrates a thirteen point reference map, according to an illustrative embodiment.

From this new triangulation, the VTEC values for a pre-defined thirteen (13) point grid are calculated. Using this simplified grid reduces the amount of data that needs to be provided to other systems in order for them to make use of the ICE model without compromising accuracy. The thirteen (13) points yield sixteen (16) predefined triangulations of those points. FIG. 8 illustrates a thirteen point reference map, according to an illustrative embodiment.

Figure 9:
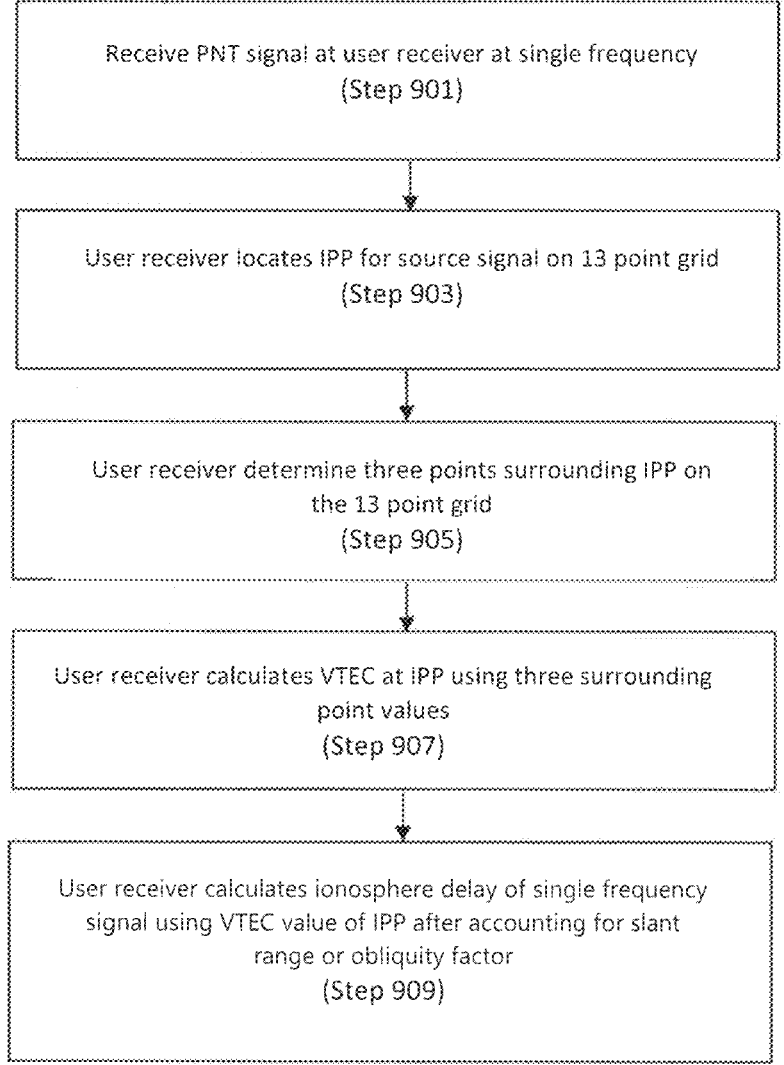
FIG. 9 is a flowchart illustrating a method for employing a Vertical Total Electronic Content contour map by a user receiver to correct a PNT signal received at a single frequency, according to an illustrative embodiment.

FIG. 9 is a flowchart illustrating a method for employing a Vertical Total Electronic Content contour map by a user receiver 18 to correct a PNT signal received at a single frequency, according to an embodiment.

At step 901, a PNT signal is received from a space-based source at a single frequency. The space-based source may be a satellite operating in a GNSS system such as a GPS satellite. Alternatively, the signal may be received from another space-based source such as a LEO satellite or MEO satellite. The signal is received at a user receiver 18 which is only operable to receive signals at a single frequency thereby negating the use of a direct measurement to correct for ionosphere induced errors.

At step 903, the receiver locates the IPP 122 for that particular space-based source on the hemisphere represented by the thirteen (13) point grid.

At step 905, the receiver determines the three points on the thirteen (13) point grid which surround the IPP 122 of the space-based source.

At step 907, the receiver computes the VTEC of the IPP 122, the Delay Point, using the below equations. For each of the three surrounding points, $x_n$ and $y_n$ are the coordinates of the point on the thirteen (13) point grid and $z_n$ is the VTEC value of the point.

$$DET = (y_2 - y_3) * (x_1 - x_3) + (x_3 - x_2) * (y_1 - y_3)$$

$$\Lambda_1 = \frac{[(y_2 - y_3) * (X_{POINT} - x_3) + (x_3 - x_2) * (Y_{POINT} - y_3)]}{DET}$$

$$\Lambda_2 = \frac{[(y_3 - y_1) * (X_{POINT} - x_3) + (x_1 - x_3) * (Y_{POINT} - y_3)]}{DET}$$

$$\Lambda_3 = 1 - \Lambda_1 - \Lambda_2$$

$$Delay_{POINT} = z_1 * \Lambda_1 + z_2 * \Lambda_2 + z_3 * \Lambda_2$$

At step 909, the Delay Point is used to calculate the ionosphere delay using the below equations. VTEC is the Delay Point and as before, Iono is the ionosphere delay, OF is the obliquity factor of the space vehicle 16, Elev_SV is the elevation of the space vehicle 16 and K is the frequency dependent conversion factor. Unlike as was done previously, a bias value is not added to the ionosphere delay as the bias of the reference receiver 12 was accounted for when calculating the thirteen (13) point grid.

$$K = \frac{40.308193 * 10^{16}}{(F)^2}$$

$$Iono_{SV,i} = (VTEC * K * OF_i) + Bias_{LOCAL}$$

$$OF_i = 1 + 16 * \left(0.53 - \frac{Elev\_SV_i}{180}\right)^3$$

The ionosphere delay is applied by the user receiver 18 to correct for ionosphere induced errors in the PNT signals.

While the invention has been described with reference to certain embodiments, numerous changes, alterations, and modifications to the described embodiments are possible without departing from the spirit and scope of the invention as defined in the appended claims, and equivalents thereof.

What is claimed is:

1. A method for correcting for ionosphere-induced errors in a positioning, navigation, and timing signal received at a single frequency, the method comprising the step of producing a reference Vertical Total Electronic Content contour map centered with respect to a single dual-frequency reference receiver and extending out to the visible horizon with respect to that reference receiver and wherein the step of producing a Vertical Total Electronic Content contour map centered with respect to a single dual-frequency reference receiver and extending out to the visible horizon with respect to that reference receiver further comprises the steps of:

identifying a reference receiver;

from a plurality of space vehicles, receiving a reference positioning, navigation, and timing signal from each space vehicle of the plurality of space vehicles at least two frequencies;

for each space vehicle of the plurality of space vehicles, measuring an ionosphere delay from a dual-frequency measurement;

determining the inter-frequency bias of the reference receiver;

for each space vehicle of the plurality of space vehicles, calculating a Vertical Total Electronic Content at an Ionosphere Pierce Point of the space vehicle relative to the reference receiver;

determining a reference Vertical Total Electronic Content contour map comprising thirteen points using a three-stage extrapolation process through the use of Delauney triangulation wherein the thirteen points correspond to the reference receiver, a location of each of four space vehicles, four cardinal points on the visible horizon and four intercardinal points on the visible horizon and wherein the three-stage extrapolation process comprises a first Delauney triangulation of reference receiver location and space vehicle location, an extrapolation of Vertical Total Electronic Content to the visible horizon and a second Delauney triangulation including a plurality of extrapolated points on the horizon and employing the reference Vertical Total Electronic Content contour map at a user receiver to correct for ionosphere induced errors in a positioning, navigation, and timing signal received at a single frequency.

2. The method for correcting for ionosphere-induced errors in a positioning, navigation, and timing signal received at a single frequency of claim 1 further comprising the steps of:

receiving a positioning, navigation, and timing signal from a space vehicle at a single frequency; and employing the reference Vertical Total Electronic Content contour map by a user receiver to correct the positioning, navigation, and timing signal received at the single frequency.

3. The method of claim 2 wherein the positioning, navigation, and timing signal is received from a low-earth orbit space vehicle.

4. The method of claim 2 wherein the positioning, navigation, and timing signal is received from a medium-earth orbit space vehicle.

5. The method of claim 2 wherein the positioning, navigation, and timing signal is received from a geosynchronous orbit space vehicle.

6. The method of claim 2 wherein the step of employing the Vertical Total Electronic Content contour map by a user receiver to correct the positioning, navigation, and timing signal received at the single frequency further comprises the step of receiving the Vertical Total Electronic Content contour reference map at the user receiver.

7. The method of claim 6 wherein the step of employing the Vertical Total Electronic Content contour map by a user receiver to correct the positioning, navigation, and timing signal received at the single frequency further comprising the steps of:

determining the Ionosphere Pierce Point of a source space vehicle on the reference Vertical Total Electronic Content contour map;

calculating a Vertical Total Electronic Content at the Ionosphere Pierce Point of the source space vehicle using the reference Vertical Total Electronic Content contour map;

determining an ionosphere delay based on the Vertical Total Electronic Content at the Ionosphere Pierce Point of the source space vehicle.

8. The method of claim 7 wherein the step of determining an ionosphere delay based on the Vertical Total Electronic Content at the Ionosphere Pierce Point of the source space vehicle further comprises the step of multiplying the Vertical Total Electronic Content at the Ionosphere Pierce Point of the source space vehicle by a conversion factor and an obliquity factor.

9. The method of claim 8 further comprising the steps of: receiving the Vertical Total Electronic Content contour map at the user equipment determining the Ionosphere Pierce Point of a source space vehicle on the reference Vertical Total Electronic Content contour map;

calculating a Vertical Total Electronic Content at the Ionosphere Pierce Point of the source space vehicle using the reference Vertical Total Electronic Content contour map;

determining an ionosphere delay based on the Vertical Total Electronic Content at the Ionosphere Pierce Point of the source space vehicle by multiplying the Vertical Total Electronic Content at the Ionosphere Pierce Point of the source space vehicle by a conversion factor and an obliquity factor.

10. The method of claim 9 wherein the step of calculating a Vertical Total Electronic Content at the Ionosphere Pierce Point of the source space vehicle using the reference Vertical Total Electronic Content contour map further comprises the steps of:

determining a three surrounding points on the reference Vertical Total Electronic Content contour map which surround the Ionosphere Pierce Point of the source space vehicle;

calculating the Vertical Total Electronic Content at the Ionosphere Pierce Point of the source space vehicle using the Vertical Total Electronic Content of the three surrounding points.

11. The method of claim 1 wherein the step of determining the inter-frequency bias of the reference receiver comprises performing a first order linear fit of a plurality of ionosphere measurements for a first frequency.

12. The method of claim 11 wherein the first frequency is the Global Positioning System L1 frequency.

13. The method of claim 12 wherein the third stage of the three-stage extrapolation process comprises the step of calculating a Delauney triangulation using the measured Vertical Total Electronic Content values extrapolated to the horizon.

14. The method of claim 1 wherein the step of calculating a Vertical Total Electronic Content at an Ionosphere Pierce Point of each space vehicle relative to the reference receiver further comprises the steps of:

for each space vehicle of the plurality of space vehicles, calculating a difference by subtracting the inter-frequency bias from each ionosphere delay;

for each difference, calculating a quotient by dividing the difference by the obliquity factor; and multiplying each quotient by a conversion factor to convert from nanoseconds of delay at a first frequency to Total Electronic Content Units.

15. The method of claim 1 wherein the first stage of the three-stage extrapolation process comprises the step of calculating a Delauney triangulation using locations for each space vehicle of the plurality of space vehicles.

16. The method of claim 1 wherein the second stage of the three-stage extrapolation process comprises the step of extrapolating the measured Vertical Total Electronic Content values to the horizon.

17. The method of claim 16 wherein the step of extrapolating the measured Vertical Total Electronic Content values to the horizon further comprises the steps of:

calculating the position of four cardinal points at the horizon;

interpolating along each of the four cardinal directions until reaching a last point that falls inside of the Delauney triangulation;

calculating coefficients for four separate straight-line fits starting from the reference receiver and extending along each cardinal direction;

extrapolating Vertical Total Electronic Content values to the horizon; and calculating four additional horizon points between the four cardinal points by averaging Vertical Total Electronic Content values of two neighboring points.

18. The method of claim 17 wherein the four additional horizon points are northeast, southeast, northwest and southwest.

19. A method for correcting for ionosphere-induced errors in a positioning, navigation, and timing signal received at a single frequency, the method comprising the steps of:

identifying a reference receiver;

from a plurality of space vehicles, receiving a reference positioning, navigation, and timing signal from each space vehicle of the plurality of space vehicles at least two frequencies;

for each space vehicle of the plurality of space vehicles, measuring an ionosphere delay from a dual-frequency measurement;

determining the inter-frequency bias of the reference receiver;

for each space vehicle of the plurality of space vehicles, calculating a Vertical Total Electronic Content at an Ionosphere Pierce Point of the space vehicle relative to the reference receiver; and determining a reference Vertical Total Electronic Content contour map comprising thirteen points using a three-stage extrapolation process through the use of Delauney triangulation wherein the thirteen points correspond to the reference receiver, a location of four space vehicles, four cardinal points on the visible horizon and four intercardinal points on the visible horizon and wherein the three-stage extrapolation process comprises a first Delauney triangulation of reference receiver location and space vehicle location, an extrapolation of Vertical Total Electronic Content to the visible horizon and a second Delauney triangulation including a plurality of extrapolated points on the horizon;

employing the reference Vertical Total Electronic Content contour map at a user receiver to correct for ionosphere induced errors in a positioning, navigation, and timing, signal received at a single frequency by receiving a positioning, navigation, and timing signal from a space vehicle at a single frequency; and user receiver correcting the positioning, navigation, and timing signal received at the user receiver at the single frequency for ionosphere induced error.

\* \* \* \* \*